United States Patent [19]

Vykukal et al.

[11] 4,311,055
[45] Jan. 19, 1982

[54] PRESSURE SUIT JOINT ANALYZER

[75] Inventors: Hubert C. Vykukal, Los Altos; Bruce W. Webbon, San Jose, both of Calif.

[73] Assignee: The United States of America as represented by the Administrator of the National Aeronautics and Space Administration, Washington, D.C.

[21] Appl. No.: 168,943

[22] Filed: Jul. 11, 1980

[51] Int. Cl.³ .............................................. G01L 3/00
[52] U.S. Cl. ................................................. 73/862.08
[58] Field of Search .......... 73/862.08, 862.19, 862.22, 73/862.04, 432 SD, 849, 806, 852

[56] References Cited

U.S. PATENT DOCUMENTS

| | | | |
|---|---|---|---|
| 1,239,014 | 9/1917 | Jaros | 73/806 |
| 2,675,703 | 4/1954 | Hemmerich et al. | 73/806 |
| 3,503,257 | 3/1970 | McElhaney et al. | 73/862.04 |

Primary Examiner—Anthony V. Ciarlante
Attorney, Agent, or Firm—Darrell G. Brekke; John R. Manning

[57] ABSTRACT

The invention pertains to a measurement system for simultaneously measuring torque and angular flexure in a pressure suit joint. One end of a joint (11) under test is held rigid. A torque transducer (31) is pivotably supported on the other movable end of the joint. A potentiometer (36) is attached to the transducer (31) by an arm (33). The wiper shaft (37) of the potentiometer is gripped by a reference arm (41) that rotates wiper shaft (37) the same angle as the flexure of joint (11). A signal is generated by the potentiometer (36) which is representative of the joint flexure. A compensation circuit (67) converts the output of the transducer (31) to a signal representative of joint torque.

6 Claims, 4 Drawing Figures

PRESSURE SUIT JOINT ANALYZER

DESCRIPTION

Origin of the Invention

The invention described herein was made by an employee of the United States Government and may be manufactured and used by or for the Government for governmental purposes without the payment of any royalties thereon or therefor.

TECHNICAL FIELD

The invention relates to a torsion testing analyzer and more particularly to a real time analyzer for continuously measuring torque and flexure angle in a pressure suit joint when the joint is moved through its flexion range.

BACKGROUND ART

Pressure suits have long been used to protect divers in pressure environments found beneath the sea. With man's entry into the exploration of celestial space, it has been found that pressure suits also have utility as protective garments in environments where the pressure is much lower than that encountered beneath the sea. Pressure suits utilized by aquanauts are commonly referred to as diving suits whereas the pressure suits employed by astronauts are frequently called space suits. Pressure suit mobility is of utmost concern to the wearer since a lack of mobility may seriously impair the success of a mission. Pressure suit joints typically exhibit torque. Even those having a neutrally stable zone still have at least one torque-producing region. Consequently, the motion of a pressure suit wearer is often impaired due to the effects of all the joint torques. Countering the torques may fatigue the wearer and prevent the accomplishment of all the mission goals.

Devices for testing the bending characteristics of items such as wires and metal strips are disclosed in U.S. Pat. Nos. 1,745,634 and 2,049,235. U.S. Pat. No. 3,122,915 reveals a torsion testing machine adapted to determine the ductility and strength of a material by twisting a sample of fixed size between one stationary and one rotating jaw. A measurement device for an excavator is disclosed in U.S. Pat. No. 4,044,610. With the device, the excavator operator is able to measure the current excavation depth and the overturning moment developed on the excavator during the loading of the shovel.

An attempt has been made to measure pressure suit joint torques with a spring scale like those used by sport fishermen to weigh fish. The spring scale was extended as the joint was flexed. The scale was used to measure the maximum force experienced and it performed this measurement very inaccurately. D. G. Mountz Associates, Inc., San Jose, Calif. 95112, manufactures and sells torque tools. Their 1978-9 catalog includes a photograph furnished by the inventors showing a Mountz torque transducer fastened to the end of a space suit joint. Pressure suit joint torque is affected by internal pressure, flexure angle and angular rate. To analyze the performance of a pressure suit joint, it is very desirable to know the torque vs flexure angle for a given internal pressure and a given angular rate. A pressure suit joint of the rolling convolute design, such as described in U.S. Pat. No. 4,091,464, must be analyzed in this fashion as the joint torque becomes zero as soon as the joint is static. At most, only force or torque data can be obtained by attaching a spring scale or a transducer to a pressure suit joint. This information is of very little value unless it is interpreted correctly and associated with accurate flexure angle data obtained dynamically.

It is therefore the general purpose of the instant invention to provide an improved pressure suit joint analyzer which overcomes the aforementioned difficulties and provides sufficient and accurate data to enable the evaluation of a joint.

Another object is to provide test apparatus which simultaneously measures joint torque and flexure angle.

Still another object is to provide a test system adapted to measure torques in a rolling convolute pressure suit joint.

DISCLOSURE OF THE INVENTION

In accordance with the present invention, an electrical torque transducer is attached to the movable end of a pressure suit joint under test and the other joint end is held rigid. One end of a linear arm is connected to the torque transducer and the other end of the arm fixedly supports the body of a potentiometer to which a voltage is applied. A reference arm with multiple parallelogram sections has an end secured to a base and a movable end that grips the wiper shaft of the potentiometer. As the joint is flexed, the linear arm tends to follow the motion and the wiper shaft of the potentiometer is rotated with respect to the resistive element. Because of the parallelograms in the reference arm, the potentiometer wiper shaft is always gripped at a constant reference angle in space. The amount of relative rotation between the wiper shaft and the resistive element is thus identical to the angular excursion of the joint as it is flexed, and the voltage at the wiper electrode of the potentiometer is always representative of the flexure angle of the joint.

The torque measured by the torque transducer is not the joint torque. The electrical output of the transducer is passed through a compensation circuit which takes into account component geometries and provides an electrical output representative of the joint torque. The torque and flexure angle signals are simultaneously transmitted to readout means in real time. Utilizing the subject invention a user could readily and objectively evaluate a matrix of pressure suit configurations. Different bearing schemes could be compared and rolling convolute joints could be compared with toroidal joints, etc.

DETAILED DESCRIPTION OF THE INVENTION

Figure 1:
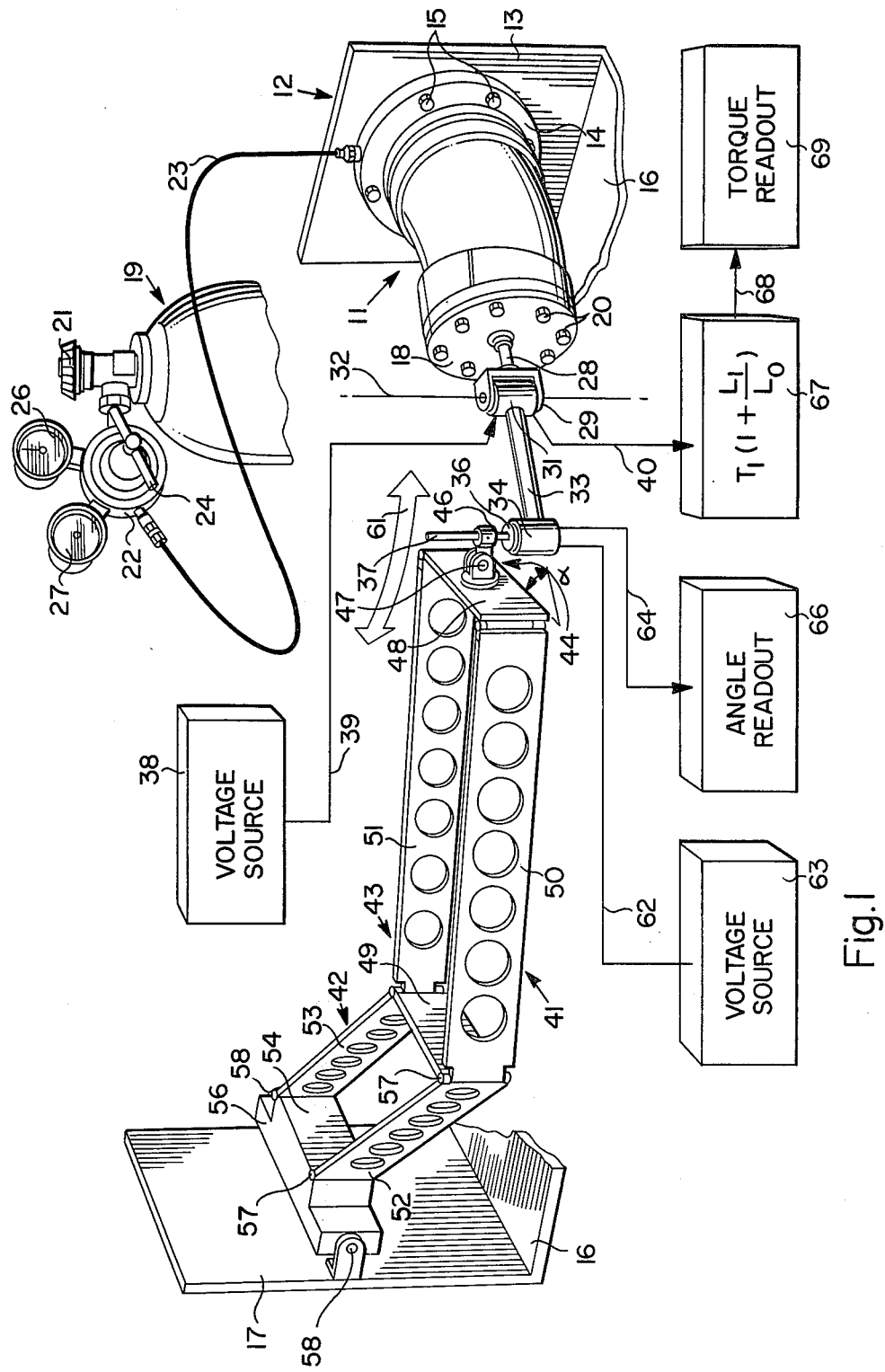
FIG. 1 is a perspective view of a pressure suit joint analyzer embodying the principles of the subject invention.

Referring now to the drawings, FIG. 1 is a perspective view of the entire pressure suit joint analyzer. Although various joints may be tested in the analyzer, for purposes of illustration, joint 11 represents a space suit elbow joint of the rolling convolute variety disclosed in U.S. Pat. No. 4,091,464, Spacesuit Mobility Joints, Hubert C. Vykukal. The proximal end of joint 11 is temporarily secured and sealed to upright wall 13 of support 12 by a ring and screws 15. Support 12 further comprises a base 16 and another wall 17 which is disposed normal thereto. The distal end of the pressure suit joint 11 is sealed for the duration of the test by circular-shaped plate 18 which is fastened to joint 11 by screws 20 or other suitable means. If desired, a gasket or o-ring may be utilized between plate 18 and joint 11 and another used under ring 14. The interior of pressure suit joint 11 is pressurized by gas provided by gas supply 19. When valve 21 is opened, gas is admitted to the interior of space suit joint 11 via a two-stage gas regulator 22 and a gas line 23. The pressure in the gas line 23 and joint 11 is controlled by rotating handle 24 clockwise or counterclockwise. Gage 26 reads the pressure on the input side of the regulator whereas gage 27 indicates the regulator output pressure. One end of stem 28 is rigidly secured to the center of plate 18. The opposite end of the stem is attached to a yoke 29. A conventional torque transducer 31 with an axis of sensitivity 32 is mounted within yoke 29. A rigid linear arm 33 interconnects transducer 31 and potentiometer holder 34. A single-turn potentiometer 36 is secured within holder 34. Transducer 31 is preferably a strain-gage type torque transducer having a flexure member with at least one strain gage thereon. A voltage is supplied to the strain gage by voltage source 38 and line 39. The transducer output on line 40 is a voltage derived from the flexed strain gage which is proportional to the torque on arm 33 about axis 32. The torque transducer may be, for example, Model ETW-20A manufactured by D. G. Mountz Associates, Inc., San Jose, Calif. 95112.

The wiper shaft 37 of potentiometer 36 is interconnected to reference arm 41 by pivotable grip 44. Wiper shaft 37 is secured within eyelet 46 of the grip and the eyelet is free to rotate about pivot 47 of the grip. The grip is mounted on end plate 48 of reference arm 41 that has parallelogram sections 42 and 43. Parallelogram section 43 includes pivotably interconnected members 48, 49, 50 and 51. Members 48 and 49 are of equal length and members 50 and 51 are of equal length. Parallelogram section 42 includes pivotably interconnected rigid members 49, 52, 53 and portion 54 of swivel base 56. Members 52 and 53 are of equal length and the length of portion 54 is the same as the length of member 49. Pivots 57 are located at each corner of each parallelogram section. Swivel base 56 is pivotally supported by brackets 58 which are secured to wall 17. At rest, stem 28 and arm 33 have substantially coincident longitudinal axes. The longitudinal axis of stem 28 is normal to plate 18. When pressure suit joint 11 is flexed, the longitudinal axis of arm 33 attempts to remain substantially perpendicular to plate 18. The preferred way of flexing joint 11 is to move potentiometer wiper 37 along arcuate path 61. The pivots in brackets 58 and pivots 57 in parallelogram sections 42, 43 permit reference arm 41 to follow the motion of arm 33 when joint 11 is flexed. In the reference arm 41, members 52 and 53 are always parallel, members 50 and 51 are always parallel, and plate 48 is always parallel to the surface of portion 54 of swivel base 56. Likewise, the pivot axis of brackets 58 always remains parallel to the pivot axis of pivot 47 in grip 44.

A voltage from source 63 is applied to the full resistive element of potentiometer 36 via line 62. The voltage developed between the potentiometer wiper contact and one end of the potentiometer resistive element is fed to readout means 66 via line 64. The voltage is proportional to angle $\alpha$, the angle subtended by the pivot axis of pivot 47 and the longitudinal axis of arm 33. Inasmuch as the pivot axis of pivot 47 always remains parallel to fixed wall 17, one side of angle $\alpha$ always maintains a fixed angular disposition in space irrespective of the position of reference arm 41. Thus, the voltage applied to readout 66 is representative of the flexure angle of pressure suit joint 11. Angle readout 66 may be, for example, a meter, a tape recorder or a pen graph recorder.

Figure 2:
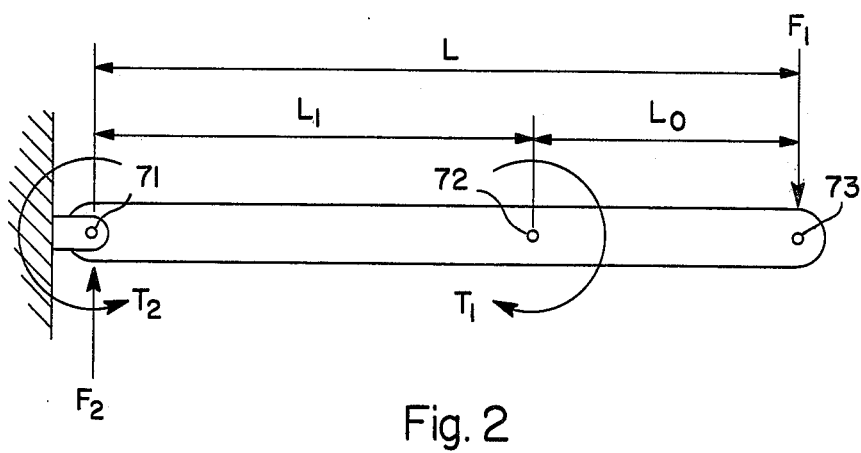
FIG. 2 is a force/torque diagram of the joint under test and two of the components attached thereto.

FIG. 2 is a force/torque diagram of the joint under test and two of the elements attached thereto. Point 71 represents the pivot of the space suit joint under test whereas points 72 and 73 represent the locations of the torque transducer 31 and potentiometer 36, respectively. The distance between point 71 and point 72 is $L_1$ and the distance between points 72 and 73 is $L_o$. The total distance between the pressure suit joint 11 and the situs of the potentiometer is L. The force on potentiometer 36 is $F_1$ and the force on the joint pivot is $F_2$. The torque on the joint pivot is $T_2$ whereas the torque measured by transducer 31 is $T_1$. Therefore, $$\Sigma F_y = F_1 - F_2 = 0$$

$$F_1 = F_2$$

$$\Sigma F_x = 0$$

$$T_1 = F_1 L_o$$

$$F_1 = T_1/L_o$$

$$T_2 = F_1 L$$

$$T_1 = F_1 L_o$$

$$T_2 = F_1 L$$

$$T_2 = (L_o + L_1) F_1$$

$$\frac{T_2}{T_1} = \frac{(L_o + L_1) F_1}{F_1 L_o}$$

$$\frac{T_2}{T_1} = \frac{L_o + L_1}{L_o}$$

$$\frac{T_2}{T_1} = \frac{L_o}{L_o} + \frac{L_1}{L_o}$$

$$\frac{T_2}{T_1} = 1 + \frac{L_1}{L_o}$$

$$T_2 = T_1 \left(1 + \frac{L_1}{L_o}\right).$$

Inasmuch as the torque measured by the transducer 31 is not the actual torque of the pressure suit joint 11, the output of transducer 31 is fed to compensation or scaling circuit 67 wherein the measured torque is multiplied by the constant $(1 + (L_1)/(L_o))$. Circuit 67 could be, for example, an operational amplifier with a gain of $(L + (L_1)/(L_o))$. The output of compensation circuit 67 is fed to readout means 69 which indicates torque $T_2$, the torque on the pressure suit joint as it is flexed. Torque readout 69 may be, for example, a meter or one channel of a tape recorder or a pen graph recorder. Elements 66, 67 and 69 could be a computer with an I/O plotter that directly plots the data in a graph format (torque on the y axis and flexure angle on the x axis).

Figure 3:
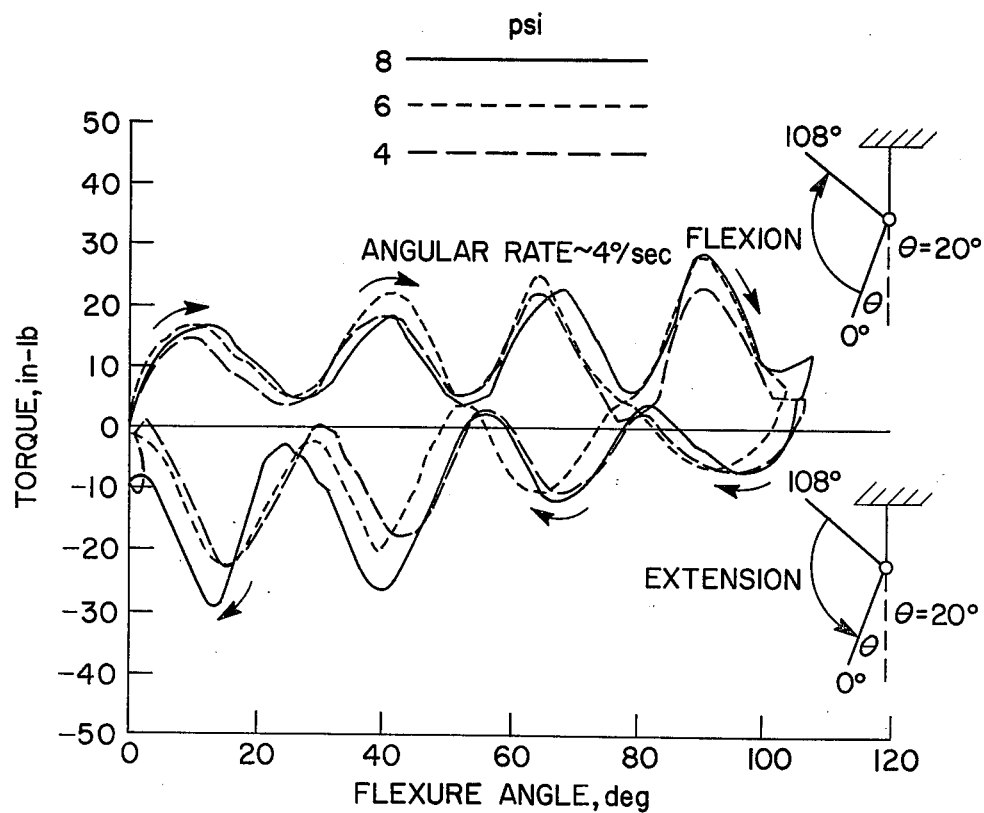
FIGS. 3 and 4 are typical torque vs angle graphs that may be obtained with the instant invention.
Figure 4:
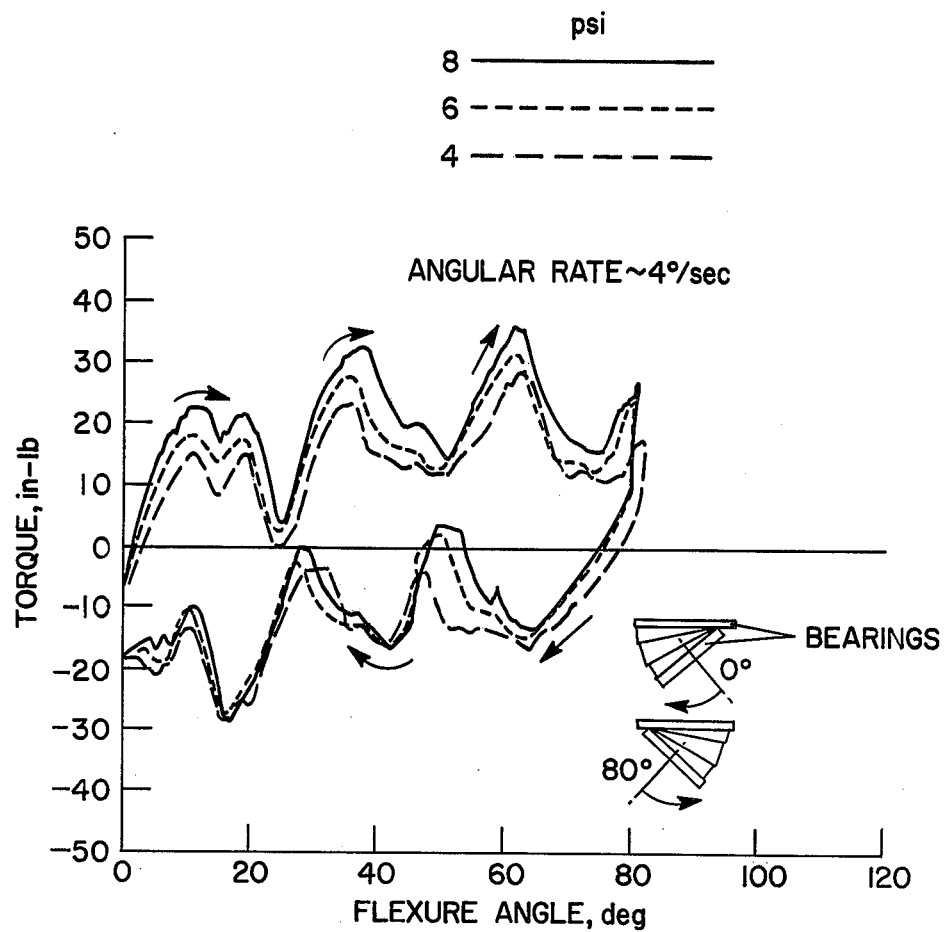

FIGS. 3 and 4 depict torque vs angle graphs utilizing the instant invention. Torque is plotted on the ordinate and flexure angle is represented on the abscissa for three different joint pressures. FIG. 3 shows the torque vs angle measurements of a rolling convolute elbow joint of the type described in U.S. Pat. No. 4,091,464 whereas FIG. 4 depicts the torque/angle measurements of a rolling convolute shoulder joint described in the same patent.

We claim:

1. Apparatus adapted for simultaneously measuring torque and flexure angle of a pressure suit joint during the state of flexure while one joint end is fixed and the other is moved, said apparatus comprising;
   transducer means attached to the movable end of said joint for generating a torque signal $T_1$;
   means attached to said transducer means for generating a voltage representative of the flexure angle of said joint; and
   means electrically coupled to said transducer means for converting said signal $T_1$ to a torque signal $T_2$ representative of said joint torque.

2. Apparatus as described in claim 1 wherein means are included for reading out said voltage representative of said flexure angle and said torque signal $T_2$.

3. Apparatus as set forth in claim 2 wherein said generating means comprises a potentiometer with a voltage source across its resistive element, means for maintaining the wiper shaft of said potentiometer at a fixed angle in spaced irrespective of the motion of said potentiometer when said joint is flexed, whereby the voltage produced at the wiper electrode of said potentiometer is representative of the joint flexure angle.

4. Apparatus as set forth in claim 3 wherein said shaft maintaining means includes a pivotable reference arm having two parallelogram sections and one end of said reference arm is secured to said potentiometer wiper shaft.

5. Apparatus adapted for simultaneously measuring torque and flexure angle of a pressure suit joint during the state of flexure while one joint end is fixed and the other is moved, said apparatus comprising;
   a torque transducer attached to the movable end of said joint and generating a signal representative of torque $T_1$;
   a potentiometer;
   arm means for connecting said potentiometer to said transducer;
   means for gripping the wiper shaft of said potentiometer and maintaining it at a fixed angle in space while said potentiometer is moved;
   means for applying a voltage to said potentiometer;
   means for extracting a voltage from said potentiometer representative of the flexure angle of said joint;
   an angle readout coupled to said extracting means;
   means for scaling said signal $T_1$ by $(1+(L_1)/(L_o))$ to produce a signal $T_2$ representative of the joint torque wherein $L_1$ is the distance between the pivot of said joint and the axis of sensitivity of said transducer, and $L_o$ is the distance between said transducer axis of sensitivity and said potentiometer; and
   a torque readout for receiving said signal $T_2$.

6. Apparatus as set forth in claim 5 wherein said shaft gripping means includes a pivotable reference arm having two parallelogram sections and one end of said reference arm is attached to said potentiometer wiper shaft.

* * * * *